MAGNETIC RELAY STRUCTURE AND SYSTEM

Filed Sept. 23, 1966 7 Sheets-Sheet 1

MAGNETIC RELAY STRUCTURE AND SYSTEM

Filed Sept. 23, 1966 7 Sheets-Sheet 2

MAGNETIC RELAY STRUCTURE AND SYSTEM

Filed Sept. 23, 1966 7 Sheets-Sheet 3

MAGNETIC RELAY STRUCTURE AND SYSTEM

United States Patent Office 3,404,358
Patented Oct. 1, 1968

3,404,358

MAGNETIC RELAY STRUCTURE AND SYSTEM

Gundokar Braumann, Walter Klor, and Hans Rotter, Munich, Germany, assignors to Siemens Aktiengesellschaft, Munich and Berlin, Germany Filed Sept. 23, 1966, Ser. No. 581,627
Claims priority, application Germany, Sept. 30, 1965, S 99,785
18 Claims. (Cl. 335—78)

ABSTRACT OF THE DISCLOSURE

This invention relates to a multiple contact relay structure, and systems employing a plurality of said structures. In particular, the relay structure comprises a magnetizable armature which can be actuated to assume a plurality of contact positions by either movable permanent magnets or by electromagnetic means. Further, additional magnetic means are provided to initially polarize the relay.

*Cross reference to related applications*

Applicant claims priority from corresponding German application, Ser. No. S 99,786, filed Sept. 30, 1965.

This application concerns a modification of the relay structures and systems described in copending application entitled, Multiple Contact Relay Structure and System, assigned to the same assignee.

The relay structure described herein, provides four possible armature positions. Further, a plurality of basic relay structures can be used in a relay circuit system, providing a multiplicity of through connections between the inputs and outputs of the system. The relay structure comprises substantially flat stamped plates, in one embodiment of the invention, and therefore requires little space and is relatively in expensive to manufacture. More particularly, the relay structure comprises a leaf spring having dual contact arms in each side thereof, which is pivotably attached to a first pole plate comprising individual spaced pole members. A permanent magnet is provided to bridge the space between the first pole members.

A magnetizable armature is affixed to the center of the leaf spring, the combination being spacedly supported from associated second and third pole plates. A contact link is attached to each of the second and third pole plates. Air gaps are defined between the first, and the second and third pole plates. Another permanent magnet is utilized to provide a magnetic bridge between the second and third pole plates.

The permanent magnets polarize and premagnetize the first, second, and third pole plates to maintain the armature in the rest position; that is, adjacent with the first pole plates. The magnetic field produced by the permanent magnets across the air gaps are equal and opposite in polarity, the force of the spring therefore maintaining the armature in the rest position.

Energization of additional electromagnetic means, or alternatively moving permanent magnets to produce a total or net magnetic field across the air gaps will magnetize and actuate the armature. First and second electromagnets or movable permanent magnets are provided to develop the armature actuating magnetic fields across the first and second air gaps, respectively.

Removal of the electromagnetic field, will not result in reactuation of the armature back to the rest position. Instead, the permanent magnets will maintain the armature in its operative contact position, since this position offers the least reluctance to the magnetic fields. However, re-energization of the electromagnetic windings, to create magnetic fields of opposite polarity to that initially developed, will develop magnetic fields across the first pole members and the second and third pole plates in directions opposite to those initially developed, and will force the armature back to the rest position.

The system described can also be provided with a closed magnetic core upon which are wound first and second windings. The windings are polarized such that excitation of only one winding results in the developed magnetic field being short circuited around said closed magnetic core. However, coincident excitation of the first and second windings develops a combined magnetic field, which produces a magnetic flux across the associated pole members and plates, thus magnetizing and actuating the armature.

The basic relay structure can be used to provide a plurality of such relay structures in a coupling unit to effect a plurality of through connections. It is seen that four different circuits positions are available. These are the rest position in which the electromagnetic fields are not present, the two selectively one-sided operation positions of the contact arms, depending upon which electromagnet field is solely created, and finally the double-sided operation position of the contact arms which results from coincident energization of the first and second electromagnets.

By arranging the basic relay structures in such a manner that they adjoin each other, a common permanent magnet can be utilized to premagnetize the first pole members, or the second pole members of each relay structure, depending upon the particular arrangement used. This effects a substantial savings in space and manufacturing cost of the relay structures. Further, by arranging a plurality of said structures in a plane such that their air gaps overlap, it is possible to use common permanent magnets and other relay components such as magnetic couplers.

*State of the prior art*

The prior art relay devices teach the use of multiple contact relays, as well as the polarization and coincidence principles discussed. However, prior art relay devices normally involve the use of large bulky components which are expensive to manufacture and difficult to combine in a compact unit. The prior art does not provide a relay structure which comprises a minimum number of relay components of the type described, and which can be easily combined to provide arrangements wherein common relay components may be used for a plurality of basic structures.

*Objects of the invention*

It is an object of the invention to provide a polarized relay structure having a minimum number of components and comprising substantially flat stamped plates, having at least four possible relay contact positions.

It is another object of the invention to utilize a plurality of relay structures in specific arrangements and embodiments to provide a coupling unit capable of producing a plurality of through connections and having particular application to long distance communication networks, such as telephone systems.

It is another object of the invention to provide a relay structure of the type described, in which coincidence of two electromagnetic fields is essential for armature actuation.

It is another object of the invention to utilize a plurality of basic relay structures arranged successively in a plane, so that common relay components can be utilized to provide a savings in space and manufacturing cost.

It is another object of the invention to provide a polarized relay system, wherein hold windings are not required, the hold magnetic energy being provided by the polarizing magnets.

These and other objects of the invention will be apparent from the following specification and drawings.

*Description of the invention*

Figure 1:
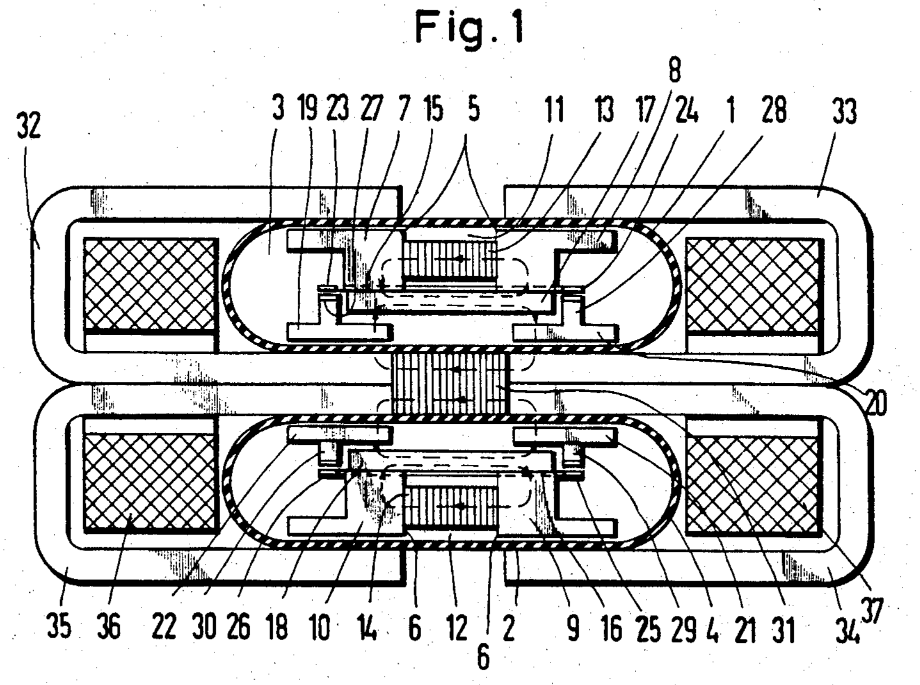
FIGURE 1 is a sectional view of the basic relay structure illustrating the polarizing magnetic fields created by the permanent magnets.

FIGURE 1 is a cross-sectional view of the basic relay structure that may be used in multiple relay systems. In particular, FIGURE 1 shows relay structures 3 and 4, each comprising a first pole plate consisting of two individual members. Thus, first pole plate 5 of relay structure 3 comprises first and second L-shaped pole members 7 and 8 respectively. Similarly, first pole plate 6 of relay structure 4 comprises individual L-shaped first and second pole members 10 and 9, respectively. Air gaps 11 and 12 are defined between pole members 7 and 8 of relay structure 3, and pole members 9 and 10 of relay structure 4, respectively. Permanent magnets 13 and 14, are polarized to effect the magnetic polarity as indicated by the flux flow direction arrows thereacross, and bridge air gaps 11 and 12, respectively.

Leaf springs 15 and 16, are respectively pivotably secured to pole members 7 and 8, and pole members 9 and 10 of relay structures 3 and 4. Further, armatures 17 and 18, are respectively pivotably attached to the center of leaf springs 15 and 16.

Spacedly mounted from the combination comprising the first pole members, the bridging magnets, the leaf spring, and the armature combinations described above are second and third pole plates 19 and 20, and 21 and 22, respectively, of relay structures 3 and 4. The leaf spring comprises a conventional type of spring, which depending upon the position of armatures 17 and 18, relative to their respective second and third pole plates, are positionable to effect specific electrical connections. The leaf springs, armatures, and second and third pole plates comprise substantially flat stamped members, and are thus relatively inexpensive to manufacture.

As illustrated in FIGURE 1, leaf spring 15 comprises contact arms 23 and 24 extending from opposite sides thereof. Furthermore, contact links 27 and 28 are respectively mechanically and electrically connected to second and third pole plates 19 and 20 and preferably comprise round wire electrical conductors. Similarly, leaf spring 16 of relay structure 4 comprises contact arms 26 and 25 which extend from opposite ends of the leaf spring. Contact links 30 and 29 are connected mechanically and electrically to second and third pole plates 22 and 21 respectively.

Preferably, the first pole plates are insulated from the second and third pole plates, and all pole plates and armatures comprise electrical as well as magnetic conductors. Thus, actuation of the armature to a contact position between the first pole plate, and the second or third pole plates, effects an electrical connection therebetween.

Also, as will be explained hereafter, the contact arms of leaf springs 15 and 16, and the contact links 27–30 are operable to effect electrical connection of the contact arms to their respective contact links. Thus, the contact arms and the contact links should comprise electrically conductive materials. Alternatively, the contact arms and contact links can be coated with electrically conductive materials.

The contact arms associated with leaf springs 15 and 16 preferably each comprise dual contact arms. This serves to increase the current-carrying capacity of the contact arms since parallel paths are thus provided. Further, should one of the dual contact arms not function because of sediment deposition thereon, the other arm will ensure electrical connection to the associated contact link. It is also noted that providing parallel paths for the current flow from the contact arms to the contact links increases the life of the contact arms since they are subjected to less current flow. This is also provided by having the pole plates and armatures comprise electrical conducting materials.

The relay structures 3 and 4 are enclosed within protective housings 1 and 2 which are air-tight, thereby preventing sediment from the atmosphere from being deposited on the various relay components. Furthermore, evacuation of air from the protective housings 1 and 2 prevents corrosion of the various relay components. Protective housings 1 and 2 can alternatively be filled with an inert gas if desired. Since FIGURE 1 is a sectional view the end plates of protective housings 1 and 2 are not shown. However, the protective housings essentially comprise an oval capsule as illustrated, into which the relay structures are fitted. After insertion of the relay structures, the ends of the capsule are closed by end plates. The end plates define holes for the outside connection lines to the relay structures. Conventional pressed glass fusing techniques may then be utilized to simultaneously seal the holes and insulate the various connection lines from each other.

Magnetic cores 32 and 33, and 35 and 34 are mounted to protective housings 1 and 2, respectively, and comprise U-shaped members. Permanent magnet 31 is supported between the ends of the magnetic cores, common to protective housings 1 and 2. As illustrated in FIGURE 1, windings 36 and 37 are wound around the magnetic cores, and are jointly shared by relay structures 3 and 4.

FIGURE 1 shows the relay system in the "rest" position, wherein the magnetic flux from permanent magnets 13, 14 and 31 flows as indicated by the flow line arrows from the magnets, in the same direction through the armatures. Thus armatures 17 and 18 are maintained in the rest position as a result of the composite magnetic force; as well as the force of leaf springs 15 and 16, which normally resets the armatures 17 and 18 to the rest position.

FIGURES 2–5 are similar to FIGURE 1 and utilize the same numerical designations for the elements illustrated therein. However, they show the effect of actuation of winding 36.

Figure 2:
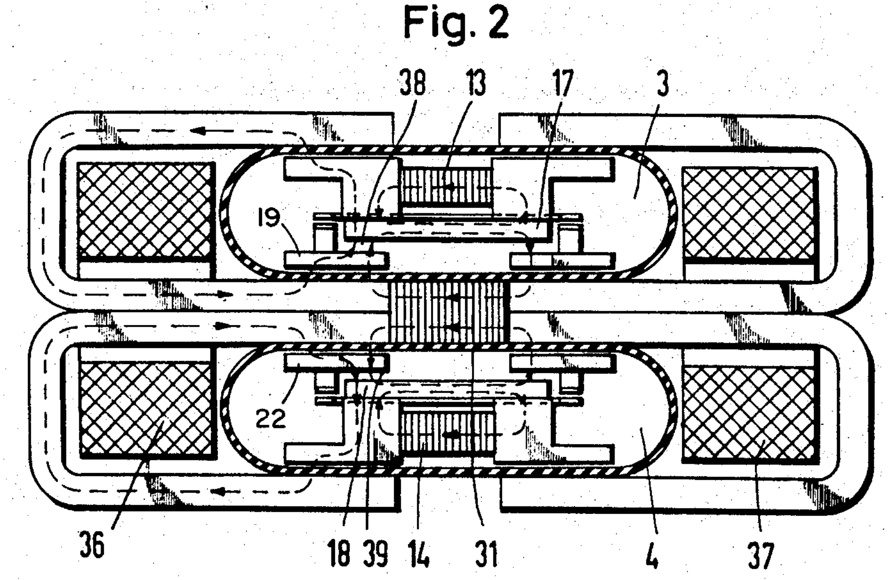
FIGURE 2 is a sectional view of the relay structure, illustrating the magnetic field developed as a result of selective energization of the electromagnet.

Thus, FIGURE 2 illustrates the position of the armatures when winding 36 is excited to effect the magnetic flux path illustrated by the broken lines and the arrow directions.

It is apparent from FIGURE 2 that the magnetic flux emanating from winding 36 is opposite in direction to the magnetic flux emanating from magnets 13 and 14, but in the same direction as the magnetic flux emanating from magnet 31. Thus the effective magnetic flux from permanents 13 and 14 is weakened, whereas the effective magnetic flux emanating from permanent magnet 31 is strengthened, in air gaps 38 and 39.

The result is that a net magnetic field exists across air gaps 38 and 39, causing magnetization of the left sides of armatures 17 and 18. Providing the net magnetic field is sufficient to overcome the counterforce of the leaf springs, the armatures 17 and 18 will be actuated into operative contact with second pole members 19 and 22, respectively. This will cause armatures 17 and 18 to assume a slanted position in the air gaps, this being illustrated in FIGURE 3, the magnetic flux path then flowing through the armatures as indicated.

As previously discussed, armatures 17 and 18 are pivotably affixed to their respective leaf springs 15 and 16. Actuation of armature 17 to contact second pole member 19, will coincidently force contact arms 23 of leaf spring 17 to be operatively connected to associated contact link 27, and contact leaf 26 to be connected to associated contact link 30.

Figure 3:
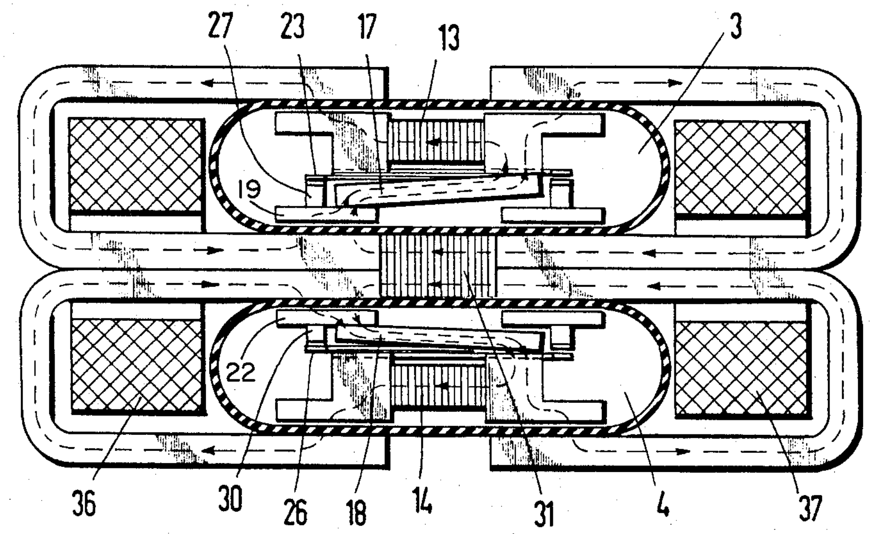
FIGURE 3 is a sectional view of the basic relay structure, illustrating the armature connected between the first pole members and the second pole plates, as a result of the magnetic field produced by energization of the electromagnet.
Figure 4:
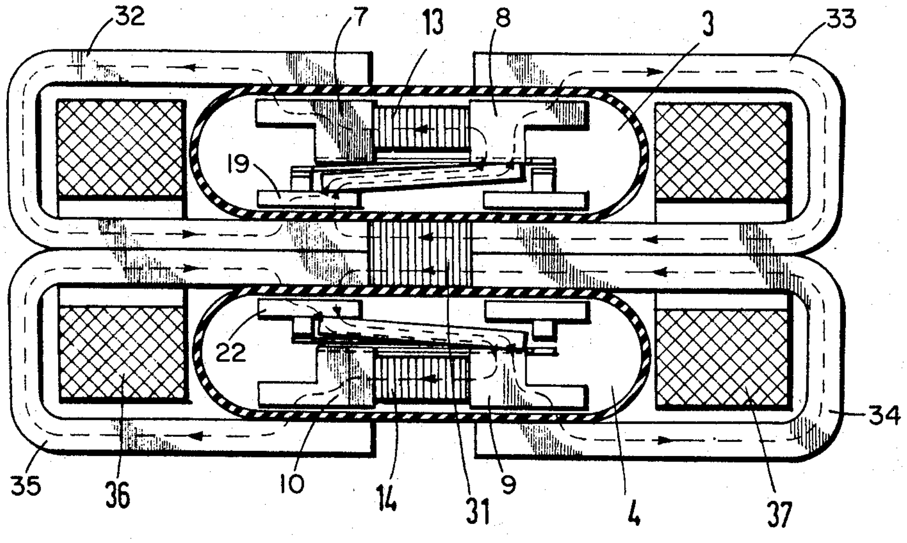
FIGURE 4 is a sectional view of the basic relay structure illustrating the magnetic fields created by the permanent polarizing magnets, to hold the armature in contact position.

If winding 36 is deenergized, armatures 17 and 18 will remain in the positions illustrated in FIGURE 3, under the influence of the magnetic flux emanating from permanent magnets 13, 14 and 31. This is illustrated in FIGURE 4 which shows the magnetic flux paths that will result when winding 36 is deenergized, with the armatures in the positions illustrated in FIGURE 3. Thus, the magnetic flux emanating from permanent magnet 13 will flow through magnetic core 32 through second pole 19 across armature 17, to first pole member 8 and back to permanent magnet 13. Similarly, the magnetic flux emanating from permanent magnet 14 flow in the complete path from permanent magnet 14 through first pole member 10, and magnetic core 35, to second pole 22, through armature 18 and return to permanent magnet 14 through first pole member 9.

The magnetic flux emanating from permanent magnet 31, will have shunt magnetic flux paths as illustrated in FIGURE 4 since it is magnetically coupled to relay structures 3 and 4. Thus, the magnetic flux will flow from permanent magnet 31 through magnetic core 32 through second pole 19, through armature 17 to first pole member 8 and return to the magnet 31 through magnetic core 33. Also, the magnetic flux will flow from permanent magnet 31 through magnetic core 34. It will be appreciated that the magnetic flux paths discussed in relation to FIGURE 4 are similar to the paths effected as a result of the energization of windings 36 and described in FIGURE 3. The paths will remain similar, since, the FIGURE 3 arrangement of armatures 17 and 18, provides magnetic paths of least relative reluctance to the permanent magnets.

Utilization of permanent magnets 13, 14 and 31 avoids the necessity of using a hold winding to maintain the contact positions effected as a result of energization of winding 36.

Figure 5:
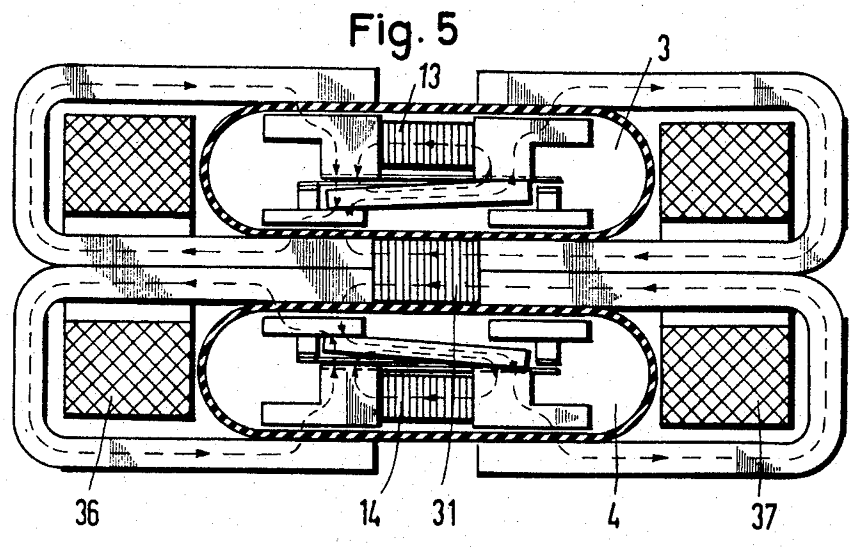
FIGURE 5 is a sectional view of the basic relay structure illustrating reenergization of the electromagnet to develop a magnetic field of opposite polarity to that initially created, and illustrated in FIGURES 2–4.

Reenergization of winding 36, to develop a magnetic field of opposite polarity to that initially produced and described in FIGURE 3, effects actuation of armatures 17 and 18 from the positions illustrated in FIGURE 4 back to the rest position illustrated in FIGURE 1. FIGURE 5 illustrates the magnetic flux conditions existing in relay systems 3 and 4 as a result of reenergization of winding 36 in such a manner. It is thus seen that the magnetic flux emanating from winding 36 aids the magnetic flux emanating from permanent magnets 13 and 14, and bucks the magnetic flux emanating from permanent magnet 31. The net result is that the armatures are forced back to the rest position illustrated in FIGURE 1. Deenergization of winding 36, thereafter, does not alter the positions of the armature, since they will then be held in the rest position as discussed in relation to FIGURE 1 by the combined effects of the net magnetic fields of permanent magnets 13, 14 and 31, and leaf springs 17 and 18.

The operation of related systems 3 and 4 has been explained in relation to actuation of winding 36. However, actuation of winding 37 will effect similar results in the associated right-side components of relay systems 3 and 4. Further, coincident energization of exciter windings 36 and 37 will actuate armatures 17 and 18, so that both ends of their respective armatures are operatively connected to the second and third pole plates. This, of course, will effect coincident contact between contact arms 23 and 24 and their associated contact links 27 and 28; and between contact arms 26 and 25, and their associated contact links 30 and 29. Subsequent deenergization of windings 36 and 37 will not result in a return of the armatures to the rest position, as explained in relation to FIGURE 4. However, reenergization of windings 36 and 37 such that they produce electromagnetic fields opposite in polarity to that initially coincidently developed, will actuate the armatures back to the rest position of FIGURE 1.

The basic relay system may also be utilized to operate according to the magnetic coincidence principle. That is, at least two windings can be provided, which must be coincidentally energized, to produce a magnetic field across the air gaps of the relay system or systems, thereby effecting armature magnetization and actuation.

Figure 6:
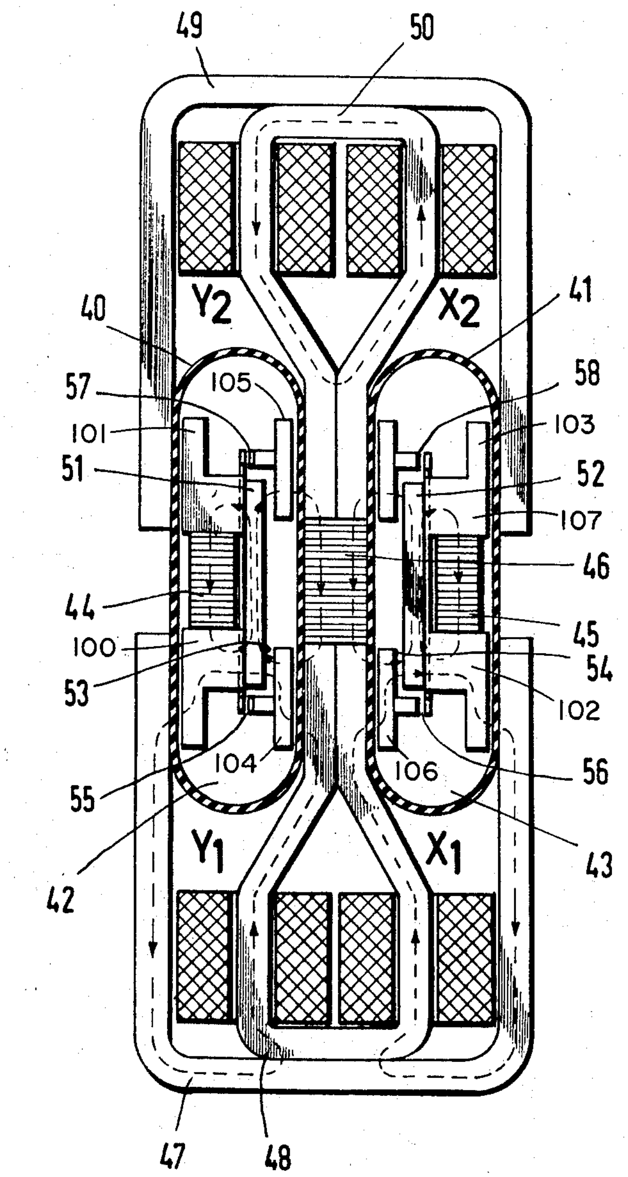
FIGURE 6 is a sectional view of the basic relay structure provided with a closed magnetic core and operating according to the coincidence principle.

With reference to FIGURE 6, protective housings 40 and 41 are provided, comprising non-magnetizable material. Relay systems 42 and 43, similar to those disclosed in the discussion relating to FIGURES 1–5, are inserted and mounted within protective housings 40 and 41, respectively. As previously discussed, protective housings 40 and 41 are sealed at the ends thereof from the atmosphere. Further, the protective housings may be air-evacuated, and filled with inert gas.

Permanent magnet 46 is mounted in the common flux conducting path between relay systems 42 and 43. Permanent magnets 44 and 45 bridge the first of second pole members of relay systems 42 and 43, respectively. These serve to magnetize the respective pole members and pole plates of each relay system, according to the polarity indicated by the magnetic flux flow paths.

The first pole members 100 and 101 of relay system 42 are polarized by permanent magnet 44, as indicated by the magnetic flux flow from permanent magnet 44 to first pole plate 100 through armature 51, to pole plate 101, and back to permanent magnet 44. Similarly, the first pole plates 102 and 103 of relay system 43 are polarized in the direction indicated by the magnetic flux flow from permanent magnet 45.

It is seen, therefore, that the magnetic fields existing across the air gaps of relay systems 42 and 43 under these conditions, are opposite in polarity, and equal in magnetic strength. Therefore, they will effectively cancel, providing no magnetic potential to magnetize and actuate armatures 51 and 52.

Now, however, assume that exciter windings $X_1$ and $Y_1$ are simultaneously excited. These windings are so poled as to produce the electromagnetic fields having the flux paths illustrated. Thus, at the junction point of the common core element 48 of electromagnets $X_1$ and $Y_1$, the magnetic fields of the electromagnets will buck. To complete the flux path back to electromagnet $Y_1$ the flux will then flow to second pole plate 104 across the air gap and armature 51, to first pole member 100, and return to the left end of electromagnet $Y_1$ through magnetic coupler 47 and core 48.

The electromagnetic field created by $X_1$, will return to the left end of electromagnet $X_1$, through second pole plate 106, through the air gap and armature 52, the first pole member 102 of relay system 43, through magnetic coupler 47 and core 48. This will effect simultaneous magnetization and actuation of the left side armatures 51 and 52, respectively, since a net magnetic field is developed across the respective armatures, which is not canceled out. Thus, the left ends of armatures 51 and 52 will be magnetized, and will be actuated and attracted towards second pole plates 104 and 106, respectively.

This will effect electrical connection between the left contact arm of relay system 42 and its associated contact link 55, and between the left contact arm of relay system 44 and its associated contact link 56.

Simultaneous excitation of windings $X_2$ and $Y_2$ will simultaneously produce magnetic fields which buck at the junction of common magnetic core element 50, thereby forcing the magnetic flux produced by windings $Y_2$ and $X_2$ to flow respectively across the relay components comprising relay systems 42 and 43 respectively. Completion of the magnetic flux path to the right side of windings $Y_2$ and $X_2$ will be effected by magnetic coupler 49 and common core element 50.

If either of windings $Y_1$ or $X_1$ is energized alone, the relay components will be magnetically short circuited, that is, the magnetic flux will flow in a closed path within common core elements 48 or 50. Such a short circuit magnetic path is illustrated in common core element 50 whereby excitation of winding $Y_2$ without coincidental excitation of winding $X_2$ produces the magnetic flux flow solely within common magnetic core 50, with the result that the right ends of the armatures will not be magnetized and actuated.

It should also be noted that windings $Y_1$ and $X_1$ and $Y_2$ and $X_2$ can be coincidently energized thereby effecting magnetization and energization of both ends of armatures 17 and 18. This, in turn, will cause electrical contacts to be established between both left and right side contact arms of relay systems 17 and 18 and their associated contact links 55, 57, 56 and 58, respectively. Therefore it is seen that coincidental energization of windings $Y_1$ and $X_1$ results in actuation of all left side relay contacts; whereas coincident actuation of core windings $X_2$ and $Y_2$ results in coincidental actuation of all right-side contacts of relay systems 41 and 42.

The holding feature discussed in relation to FIGURES 3 and 4, also applies in relation to FIGURE 6. Thus, assume that windings $X_1$ and $Y_1$ are similarly energized, to effect operation of the left side relay contacts. The deenergization of either or both of said windings will not result in a return to the rest position of the armaures, since permanent magnets 44, 45 and 46 will maintain the armature position wherein the armatures 51 and 52 are in contact with second pole plates 104 and 106 respectively. This magnetic flux path is illustrated in FIGURE 4 and it is maintained because the reluctance thereof is substantially less than the reluctance across the air gaps encountered by the permanent magnets, when the armature is in the rest position.

Should windings $X_1$, $X_2$, $Y_1$, and $Y_2$ be deenergized, the armature will maintain its position because of the hold magnetism provided by the permanent magnets. Subsequent energization of a single winding will not change the armature position since the magnetic field produced by the winding will be short circuited, as previously discussed.

Reenergization of exciter windings $X_1$, and $Y_1$, or of $X_2$, and $Y_2$ simultaneously to produce magnetic fields of opposite polarity from that produced when initially energized, will function to actuate the armatures back to the rest position. The principle involved is the same as that discussed in relation to FIGURES 4 and 5. That is, the strength of the magnetic field emanating from permanent magnet 45 will be weakened while the magnetic field emanating from permanent magnets 44 and 46 will be simultaneously strengthened, because of the reversal of the magnetic polarity of the electromagnetic fields. Thus, the total magnetic force exerted on armatures 51 and 52 attracting it to the first pole members 100, 101; and 102, 103 will magnetize and actuate the armatures back to the rest position.

Figure 7:
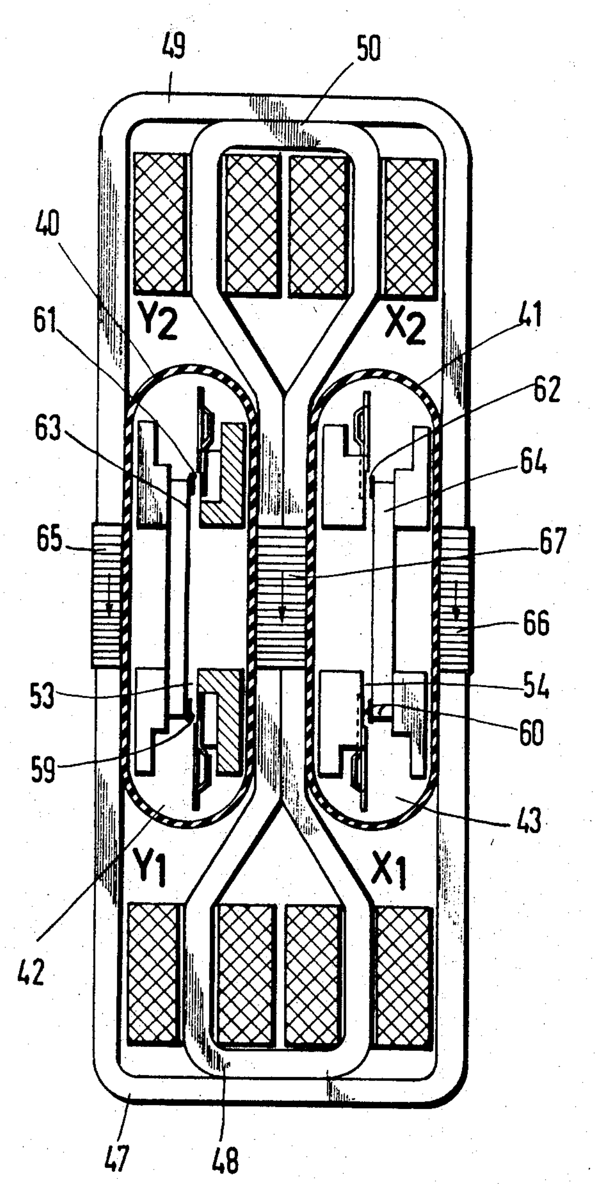
FIGURE 7 is a sectional view of another embodiment of the basic relay structure described in FIGURE 6 but having different arrangements of the permanent magnets, armature, and contact points.

FIGURE 7 is substantially similar to the configuration illustrated in FIGURE 6 and also operates according to the coincidence principle discussed. There are some differences, however, in the specific armatures 63 and 64; permanent magnets 65–66, and contact members 59–62 utilized. Thus, it is seen that permanent magnets 65 and 66 are mounted between the ends of magnetic couplers 47 and 49 and comprise a magnetic bridge therebetween. The advantage in this is that the permanent magnets are thus utilized as part of the flux return path for the magnetic fields created by the electromagnetic fields. Further, this permits utilization of the space within the circuit system that is required when the outside permanent magnets are mounted between their respective first pole members as illustrated in FIGURE 6.

Also armatures 63 and 64 are provided with contact members 59–62 attached thereto which may be operatively connected to associated contact links on the second and third pole plates. Thus, it is seen that the armature is provided with contact members to replace or supplement the contact arms of the leaf springs.

Figure 8:
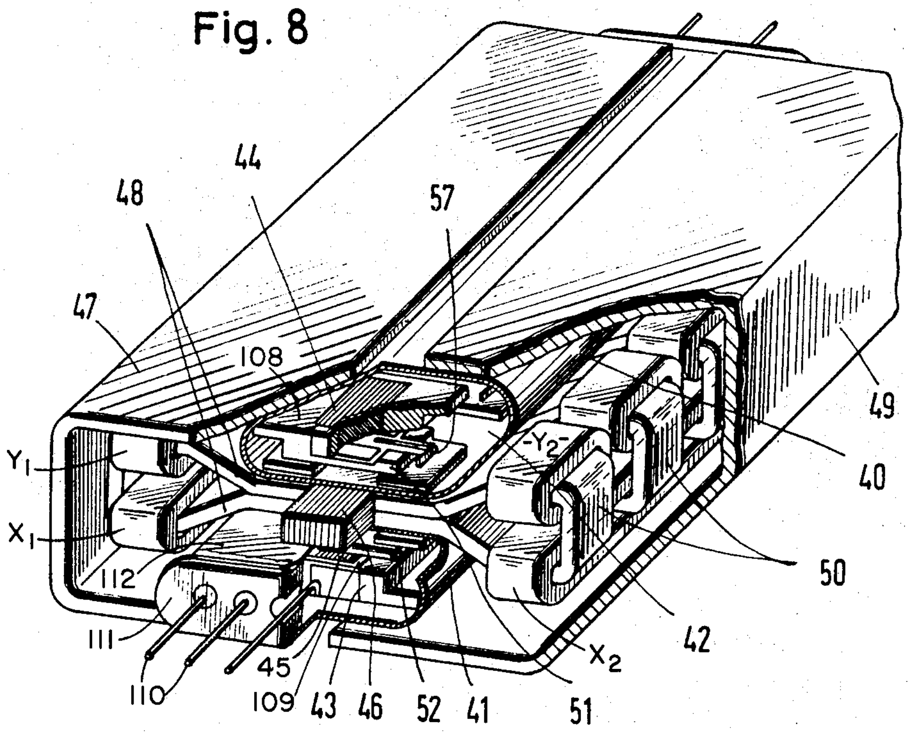
FIGURE 8 is a perspective view of the basic relay structure described in relation to FIGURE 6 showing the mechanical arrangement of a plurality of such systems in an integral housing.

FIGURE 8 is a mechanical representation of a plurality of relay systems of the type illustrated in FIGURE 6, mounted successively such that the air gaps of each system are connected in successive series. Relay systems 42 and 43 are illustrated as enclosed within protective housings 40 and 41, respectively, which are partially cut away to more fully disclose the mechanical arrangement therein. Permanent magnets 44 and 45 are fitted securely within the first pole plates 108 and 109. It is seen that they are positioned symetrically and are peripherally enclosed by the first pole plates. Permanent magnet 46 is securely mounted between the ends of core elements 48 and 50, and comprises a common magnet extending through the plurality of relay systems. This effects a substantial savings in the cost that would be involved in utilizing separate permanent magnets for each relay system.

Further, armature 51 is shown relative to its effecting connection between the leaf spring, and contact link 57.

Magnetic core elements 48 and 50 are also shown as comprising bottle shaped members upon which windings $X_1$, $Y_1$, $X_2$, and $Y_2$ are wound. Magnetic coupler 49 encloses the relay systems and provides a support therefore. The ends of the protective housings 112 are sealed with end plates 111, through which the connection lines 110 of the relay systems protrude. These are insulated from each other. The end plates effect an atmospheric seal, since they comprise conventional pressed fused glass stoppers inserted around the connection lines, and within the holes defined therefore by end plate 111.

Figure 9:
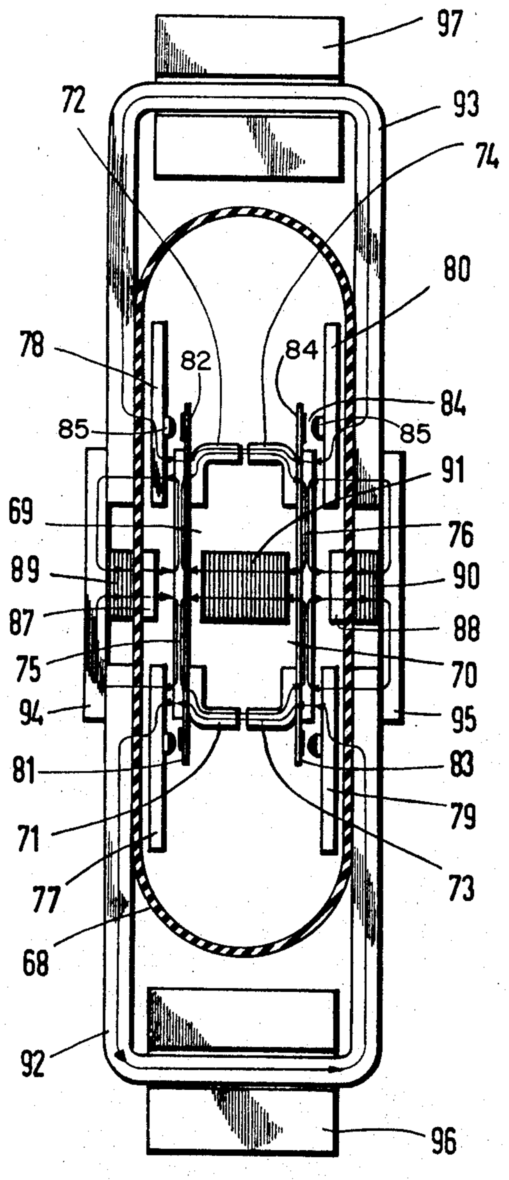
FIGURE 9 is a sectional view of another arrangement of two basic relay structures, arranged as mirror images, with the first pole plates facing each other.

FIGURE 9 differs from the basic circuit systems discussed in relation to FIGURES 1–8 in that two relay systems 69 and 70 are mounted on top of each other as mirror images with their first pole plates facing. It will be appreciated that a plurality of such arrangements of relay systems can be positioned successively vertically to the plane of the drawing. The first pole plates of the relay system illustrated in FIGURE 9 comprise two elbow-shaped members 71 and 72; and 73, and 74, of relay systems 69 and 70. Further, relay systems 69 and 70 comprise armatures 75 and 76, and second and third pole plates 77 and 78, and 79 and 80, respectively. The armatures are attached to leaf springs which are attached to the respective first pole plates. The leaf springs define extended contact arms 81–84, which may be operatively connected to associated contact links 85.

To improve magnetic flux linkage, flux conductor links 87 and 88 are utilized, with permanent magnets 89, 90 and 91 polarizing the magnetic circuits as previously discussed in relation to FIGURES 1–8. Magnetic couplers 92–95 complete the magnetic circuit, permanent magnets 89, 90, and 91 providing the polarizing magnetic flux flows illustrated in FIGURE 9.

Windings 96 and 97 are wound around magnetic couplers 92 and 93, respectively, to provide the electromagnetic fields to actuate the armatures. When energized they produce the magnetic flux flows illustrated, to magnetize and actuate the armatures, as discussed in relation to FIGURES 1–5.

It is seen in relation to FIGURE 9, that a common permanent magnet 91 is used to premagnetize the first pole members, the second and third pole members of each relay system being provided with separate permanent magnets 89 and 90 to effect premagnetization thereof. In this manner polarization of the relay systems is effected. Further, the arrangement illustrated in FIGURE 9 provides utilization of a common permanent magnet, thereby producing a savings in manufacturing cost and space. Alternative to the permanent magnet arrangements illustrated in FIGURES 1–5, it is therefore seen that a common and permanent magnet may be used to premagnetize the first pole plates of a plurality of relay structures.

Figure 10:
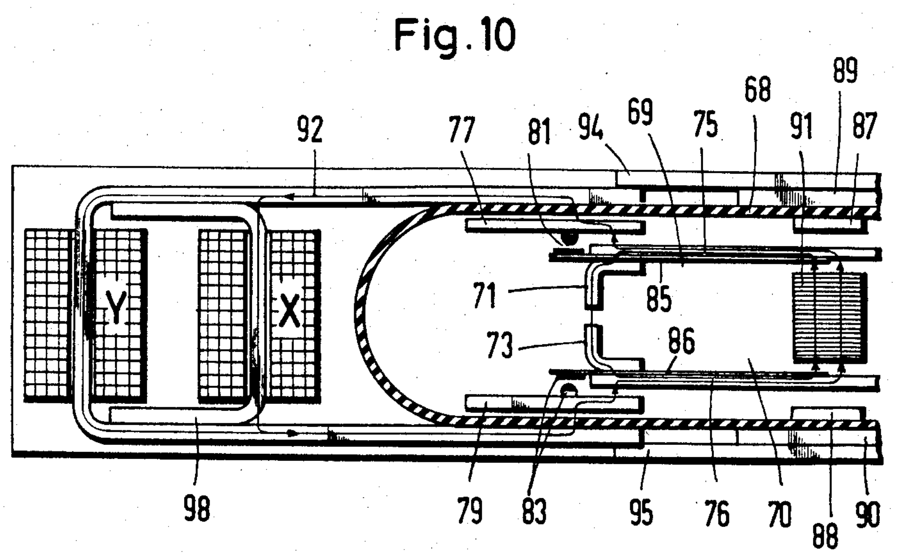
FIGURE 10 is a modification of the embodiment illustrated in FIGURE 9, to effect operation according to the coincidence principle.

FIGURE 10 substantially comprises the same relay system arrangement illustrated in FIGURE 9. However, additional magnetic coupler elements 98 and 98' are utilized so that the system functions according to the coincidence principle. Only the left end of the relay system is shown, the right end comprising similar relay components.

It is seen that excitation of winding X alone, or winding Y alone, will cause the magnetic flux created thereby to be short circuited around the closed magnetic path comprising magnetic couplers 92 and 98. However, by polarizing windings X and Y so that they coincidently produce magnetic fields which buck at their common junction point, it will be apparent that the magnetic fields will combine and be forced to flow through the remaining sections of magnetic couplers 92 and 94 thereby magnetizing and actuating the armatures of the relay system. The magnetic flux paths are illustrated in FIGURE 10, under these conditions.

What is claimed is:

1. A magnetically actuable relay structure comprising:

a first magnetizable pole plate (5), second (19) and third (20) magnetizable pole plates spacedly positioned in the same plane, the first and second pole plates, and the first and third pole plates, respectively, defining first and second air gaps therebetween, a magnetizable armature (17) having first and second ends, support means (15) connected to the magnetizable armature (17) to selectively position the first and second ends within the first and second air gaps in response to the magnetic fields produced therein;

first (13) and second (31) polarizing magnetization means coupled to the first pole plate and the second and third pole plates to produce equal and opposite first and second magnetic fields between the first and second, and first and third pole plates, respectively, magnetization means (36, 37) to selectively produce a third magnetic field in the first air gap between the first and second pole plates to magnetize the first end of the armature, and actuate the first and second ends of the armature to contact the second and first pole plates respectively; and to selectively produce a fourth magnetic field in the second air gap between the first and third pole plates to magnetize the second end of the armature, and actuate the first and second ends of the armature to contact the first and third pole plates respectively; and to selectively produce the third and fourth magnetic fields in the first and second air gaps, respectively, simultaneously to magnetize and actuate the first and second ends of the armature to contact, respectively, the second and third pole plates.

2. A magnetically actuable relay system comprising:

first (3) and second (4) relay structures, each having a first magnetizable pole plate (5, 6); second (19, 22) and third (20, 21) magnetizable pole plates spacedly positioned in the same plane; the first and second pole plates, and the first and third pole plates respectively defining first and second air gaps therebetween;

a magnetizable armature (17, 18) having first and second ends; support means (15, 16) connected to the magnetizable armature (17, 18) to selectively position the first and second ends within the first and second air gaps, respectively, in response to the magnetic fields produced therein;

polarizing magnetization means (13, 14, 31) magnetically coupled to the first, second and third pole plates of the first and second relay structures, to produce equal and oppositely poled first and second magnetic fields between the first and second pole plates, and the first and third pole plates, respectively;

magnetization means (36, 37) coupled to the first and second relay structures to selectively develop third magnetic fields in the first air gaps; between the first and second pole plates to magnetize the first end of the armature and actuate the first and second ends of the armature to contact the second and first pole plates respectively; and to selectively develop fourth magnetic fields in the second air gaps; between the first and third pole plates to magnetize the second end of the armature and actuate the first and second ends of the armature to contact the first and third pole plates respectively; and to selectively develop the third and fourth magnetic fields in the first and second air gaps; simultaneously to magnetize and actuate the first and second ends of the armature to contact respectively the second and third pole plates.

3. The magnetically actuable relay system described in claim 2 wherein the first (3) and second (4) relay structures are positioned adjoining each other as mirror images thereof, respectively, second (19, 22) and third (20, 21) pole plates facing each other.

4. The magnetically actuable relay system described in claim 3 wherein the first pole plates of the first and second relay structures comprise first (7, 10) and second (8, 9) spaced pole members, respectively opposite the second and third pole plates.

5. The magnetically actuable relay system as described in claim 4 wherein the polarizing magnetization means comprises first (13) and second (14) permanent magnets respectively bridging the space between the first and second pole members of the first and second relay structures, and a common third permanent magnet (31) bridging the space between the second and third pole plates, of the first and second relay structures.

6. The magnetically actuable relay system described in claim 5 further comprising a plurality of said relay systems arranged so that the air gaps of the plurality of systems are positioned successively in series with the common third permanent magnet (46), coextensive with the plurality of relay systems.

7. The magnetically actuable relay system described in claim 6 wherein magnetic coupler means (32, 33, 34, 35) are connected between the first and second pole members and the second and third pole plates respectively, of the first and second relay structures.

8. The magnetically actuable relay system described in claim 7 wherein at least one of said first, second, and third permanent magnets is positioned within the magnetic coupler means.

9. The magnetically actuable relay system described in claim 5 further comprising first (1) and second (2) protective hermetically sealed housings, the first and second relay structures respectively mounted therein, the first (13) and second (14) permanent magnets supported within the protective housing, the common third permanent magnet (31) supported outside the protective housing.

10. The magnetically actuable relay system described in claim 2 wherein said first and second relay structures are positioned adjoining each other, as mirror images thereof, respectively, first pole plates facing each other; (FIG. 9).

11. The magnetically actuable relay system described in claim 10 wherein the first pole plates of the first and second relay structures comprise first (71, 72) and second (72, 74) spaced pole members.

12. The magnetically actuable relay system described in claim 10 wherein the polarizing magnetization means comprises first (89) and second (90) permanent magnets bridging the space between the second and third pole plates, and a common third permanent magnet (91) bridging the space between the first and second pole members, of the first and second relay structures.

13. The magnetically actuable relay system described in claim 12 wherein magnetic coupler means (92–95) are connected between the first and second pole members and the second and third pole plates respectively, of the first and second relay structures.

14. The magnetically actuable relay system described in claim 13 wherein at least one of the first, second, and third permanent magnets is positioned within the magnetic coupler means.

15. The magnetically actuable relay system described in claim 2 wherein the magnetization means comprises first (96) and second (97) electro-magnets to develop the third and fourth magnetic fields, respectively.

16. The magnetically actuable relay system described in claim 15 wherein said first and second electromagnets each comprise:

two windings (X, Y; X′, Y′), a closed magnetic core (92, 98; 93, 98′), said two windings wound thereon and polarized such that energization of only one of said windings produces a corresponding magnetic field which is short circuited around said common closed magnetic core, and coincident energization of both windings produce bucking magnetic fields within said closed common magnetic core which combine to produce an additive electromagnetic field.

17. The magnetically actuable relay structure recited in claim 1 wherein the first pole plate (5) comprises first (7) and second (8) spaced pole members positioned oppositely to the second and third pole plates, respectively.

18. The magnetically actuable relay structure recited in claim 17 wherein the polarizing magnetization means comprises a first magnet (13) bridging the first and second pole members, and a second magnet (31) bridging the second and third pole plates.

References Cited

UNITED STATES PATENTS

| | | | |
|---|---|---|---|
| 1,541,618 | 6/1925 | Brown | 335—78 |
| 3,115,562 | 12/1963 | Robinson | 335—179 |

BERNARD A. GILHEANY, *Primary Examiner.*

H. BROOME, *Assistant Examiner.*

U.S. DEPARTMENT OF COMMERCE

PATENT OFFICE

Washington, D.C. 20231

UNITED STATES PATENT OFFICE

CERTIFICATE OF CORRECTION

Patent No. 3,404,358 October 1, 1968

Gundokar Braumann et al.

It is certified that error appears in the above identified patent and that said Letters Patent are hereby corrected as shown below:

Column 11, line 12, "72" should read -- 73 --.

Signed and sealed this 10th day of March 1970.

(SEAL)
Attest:

Edward M. Fletcher, Jr.
Attesting Officer

WILLIAM E. SCHUYLER, JR.
Commissioner of Patents